US011687415B2

(12) United States Patent
Brenner et al.

(10) Patent No.: US 11,687,415 B2
(45) Date of Patent: Jun. 27, 2023

(54) NETWORK INFORMED POLICY CREATION FOR OPTIMIZING BACKUP OPERATIONS IN A DATA PROTECTION SYSTEM

(71) Applicant: Dell Products L.P., Round Rock, TX (US)

(72) Inventors: Adam Brenner, Mission Viejo, CA (US); Mark Malamut, Aliso Viejo, CA (US); Arun Murti, Mission Viejo, CA (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 17/490,836

(22) Filed: Sep. 30, 2021

(65) Prior Publication Data

US 2023/0099626 A1  Mar. 30, 2023

(51) Int. Cl.
*G06F 11/14* (2006.01)
*H04L 43/08* (2022.01)
*H04L 67/1097* (2022.01)
*H04L 67/141* (2022.01)
*H04L 41/50* (2022.01)
*H04L 67/1095* (2022.01)

(52) U.S. Cl.
CPC ...... *G06F 11/1461* (2013.01); *G06F 11/1464* (2013.01); *H04L 41/50* (2013.01); *H04L 43/08* (2013.01); *H04L 67/1095* (2013.01); *H04L 67/1097* (2013.01); *H04L 67/141* (2013.01); *G06F 2201/84* (2013.01)

(58) Field of Classification Search
CPC ............ G06F 11/1461; G06F 11/1464; G06F 2201/84; H04L 41/50; H04L 43/08; H04L 67/1095; H04L 67/1097; H04L 67/141
See application file for complete search history.

(56) References Cited

U.S. PATENT DOCUMENTS

| 7,526,570 | B2* | 4/2009 | Rooholamini | .......... H04L 45/00 |
| | | | | 709/241 |
| 10,083,095 | B1* | 9/2018 | Chopra | ............... G06F 11/1464 |
| 10,248,618 | B1* | 4/2019 | Gaurav | ................ G06F 16/128 |
| 2011/0239013 | A1* | 9/2011 | Muller | .................... G06F 1/329 |
| | | | | 713/320 |
| 2013/0205063 | A1* | 8/2013 | Zhang | ................. G06F 11/1464 |
| | | | | 711/E12.008 |
| 2016/0342483 | A1* | 11/2016 | Klingenberg | ....... G06F 11/3006 |
| 2017/0034031 | A1* | 2/2017 | Willis | ................... H04L 43/045 |

* cited by examiner

Primary Examiner — Viet D Vu
(74) Attorney, Agent, or Firm — Staniford Tomita LLP (57) ABSTRACT

Embodiments for optimizing a backup operation for a data protection system, by connecting with network devices in a network implementing the backup operation, the backup operation implementing a policy that specifies a plurality of service requirements and that is initiated at a time within a plurality of time windows, and determining a size of dataset to be backed up by the backup operation. The method further monitors a flow of data between a source and a destination of data in the network, compiles historical data of operational parameters for data transfers between the source and destination, and determines an optimum time within the plurality of time windows based on the dataset size and the historical data.

16 Claims, 8 Drawing Sheets

| Timestamp | Device | Bandwidth | | |
|---|---|---|---|---|
| | | Incoming (Mbps) | Outgoing (Mbps) | Uplink (Gbps) |
| Monday 12:00AM | Primary | 500 | 1000 | 10 |
| Monday 12:00AM | Secondary | 800 | 1 | 1 |
| Monday 12:20AM | Primary | 200 | 1,000 | 10 |
| Monday 12:20AM | Secondary | 20 | 500 | 1 |
| Monday 12:40AM | Primary | 2,000 | 4,000 | 10 |
| Monday 12:40AM | Secondary | 200 | 1 | 1 |
| Monday 1:00AM | Primary | 8,000 | 5,000 | 10 |
| Monday 1:00AM | Secondary | 200 | 800 | 1 |

| Timestamp | Result | Selected |
|---|---|---|
| Monday 12:00AM | 75GB (backup size) / 25MB/s = 50 minutes | No |
| Monday 12:20AM | 75GB (backup size) / 122.5MB/s = 10 minutes and 12 seconds | Yes |
| Monday 12:40AM | 75GB (backup size) / 100MB/s = 12 minutes and 30 seconds | No |
| Monday 1:00AM | 75GB (backup size) / 100MB/s = 12 minutes and 30 seconds | No |

NETWORK INFORMED POLICY CREATION FOR OPTIMIZING BACKUP OPERATIONS IN A DATA PROTECTION SYSTEM

TECHNICAL FIELD

This invention relates generally to data protection systems, and more specifically to using network device information and history data to optimize application of data protection policies.

BACKGROUND

Backup software is used by large organizations to store their data for recovery after system failures, routine maintenance, archiving, and so on. Backup sets are typically taken on a regular basis, such as hourly, daily, weekly, and so on, and can comprise vast amounts of information. Backup programs are often provided by vendors that provide backup infrastructure (software and/or hardware) to customers under service level agreements (SLA) that set out certain service level objectives (SLO) that dictate minimum standards for important operational criteria such as uptime and response time, etc. The various protection requirements and different network entities, i.e., data sources and storage devices, dictate the various data protection policies that are defined and used in a backup system.

Backing up data involves a series of stages. The first stage might be copying the data in a form of a snapshot of a virtual machine, file system, block device, database, and so on. Another stage is the movement of that copy to another location like secondary storage. Customer environments might have more stages afterwards, such as tiering the data to the cloud or replicating the data for disaster recovery. A present problem is that current backup software treats all stages as a single stage as opposed to separate stages. That is, the backup software applies a defined backup policy on all stages as one process. In addition, the different backup stages are dependent on multiple systems, such as primary and secondary storage as well as other activity within the network. It is assumed that both primary and secondary systems are not single-use systems but rather have multiple purposes, such as serving multiple workloads, virtual machines, file systems, and so on. It can become unpredictable for system administrators to determine the load of a system at any given time. For end users, this means that problems can arise and manifest themselves into primary and secondary storage systems being overloaded during backup windows. The result of overloaded systems is that backups may fail to run, backup service level objectives may not be met, replication may fall behind schedule or any combination of those.

Present tools available to network operators may help them select the shortest route or path within a network. These tools, however, only look at items like latency, number of dropped packets and other similar quality metrics. They lack other useful information, such as exact size of the transfer along with historical information to determine not only the best path but also the best time to transfer the data.

What is needed, therefore, is data protection software that provides an effective way to decouple the stages of backup and optimize data transfers across the network by determining best times to transfer data as well as best paths.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud-based network system or very large-scale wide area network (WAN), and metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Networking equipment such as managed switches, core routers and firewall devices have important configuration data that is stored on each device. These configurations include network (e.g., VLAN) tags, per port activation/link speed, domain routing protocol (e.g., BGP/OSPF) settings, firewall rules, high availability/redundancy settings, and so on, and are generally critical to running a network.

In embodiment, each network device (switch, router, firewall, etc.) has their management network port connected to an out-of-band network, which is a secured and limited access network used to configure and monitor all network devices, and which is not accessible by the production network. The production network is a series of networks that customers may sub-divide with the use of VLANs or additional routes.

Figure 1A:
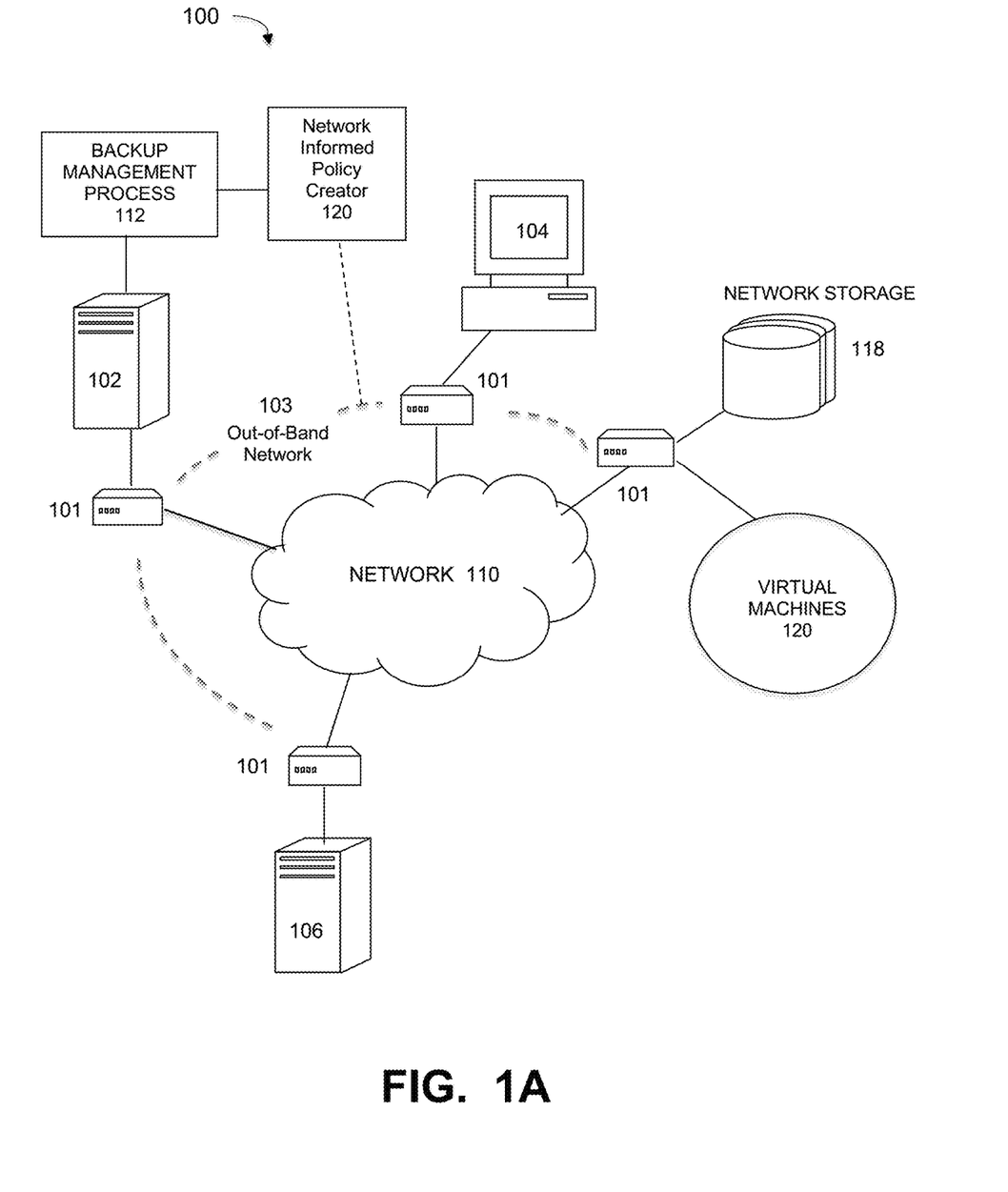
FIG. 1A is a diagram of a network implementing a network informed policy creator for a data backup system, under an embodiment.

FIG. 1A illustrates a computer network system that applies network informed policy creation for data protection using out-of-band network equipment devices, under some embodiments. For network 100, a number of network resources, such as server computers 102, 106, desktop or portable computers 104, storage devices 118, and other similar system resources.

For the embodiment of FIG. 1A, at least one server 102 may be a backup and/or storage server that executes a data storage or backup management process 112 that coordinates or manages the backup of data from one or more data sources to storage devices, such as network storage 118, client storage, and/or virtual storage devices 120. With regard to virtual storage, any number of virtual machines (VMs) or groups of VMs (e.g., organized into virtual centers) 120 may be provided to serve as backup targets. The VMs or other network storage devices serve as target storage devices for data backed up from one or more data sources, such as storage server 102 or other data source, in the network environment. The data sourced by the data source may be any appropriate data, such as database data that is part of a database management system, and the data may reside on one or more hard drives for the database(s) in a variety of formats.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 118, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The network server computers are coupled directly or indirectly to each other and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

For the embodiment of FIG. 1A, each computer, storage device, or other resource is connected to network 110 or other resources through some sort of network equipment or interface device 101. Such as device may be switch, router, modem, load balancer, buffer, or some other similar device that conditions the data or otherwise facilitates interface of the computer (e.g., 102, 104, 106) with the network 110. The interface may be embodied as an external device, or it may be at least partially integrated with the computer itself.

In an embodiment, the network equipment devices 101 are part of an out-of-band network 103, which is an abstraction of the actual network connectivity among these devices to show that they are subject to out-of-band management protocols that involve the use of management interfaces or serial ports for managing and connecting this equipment. Such out-of-band management usually involves the use of a dedicated management channel for device maintenance. It allows a system administrator to monitor and manage servers and other network-attached equipment by remote control regardless of whether the machine is powered on, or whether an operating system is installed or functional, and is in contrast to in-band management that involves simply connecting to a switch using normal network connectivity. Out-of-band management allows the network operator to establish trust boundaries in accessing the management function to apply it to network resources, and to ensure management connectivity.

In an embodiment, network devices 101 (also referred to as "network equipment" or "network equipment device" or "network interface devices") can be considered any of the following: managed switches, core routers, firewalls, load balancers, and so on. For the purpose of description, embodiments will be generally described with respect to managed switches, however it should be noted that embodiments are not so limited and may include any type of network equipment, interface, or infrastructure device.

Figure 1B:
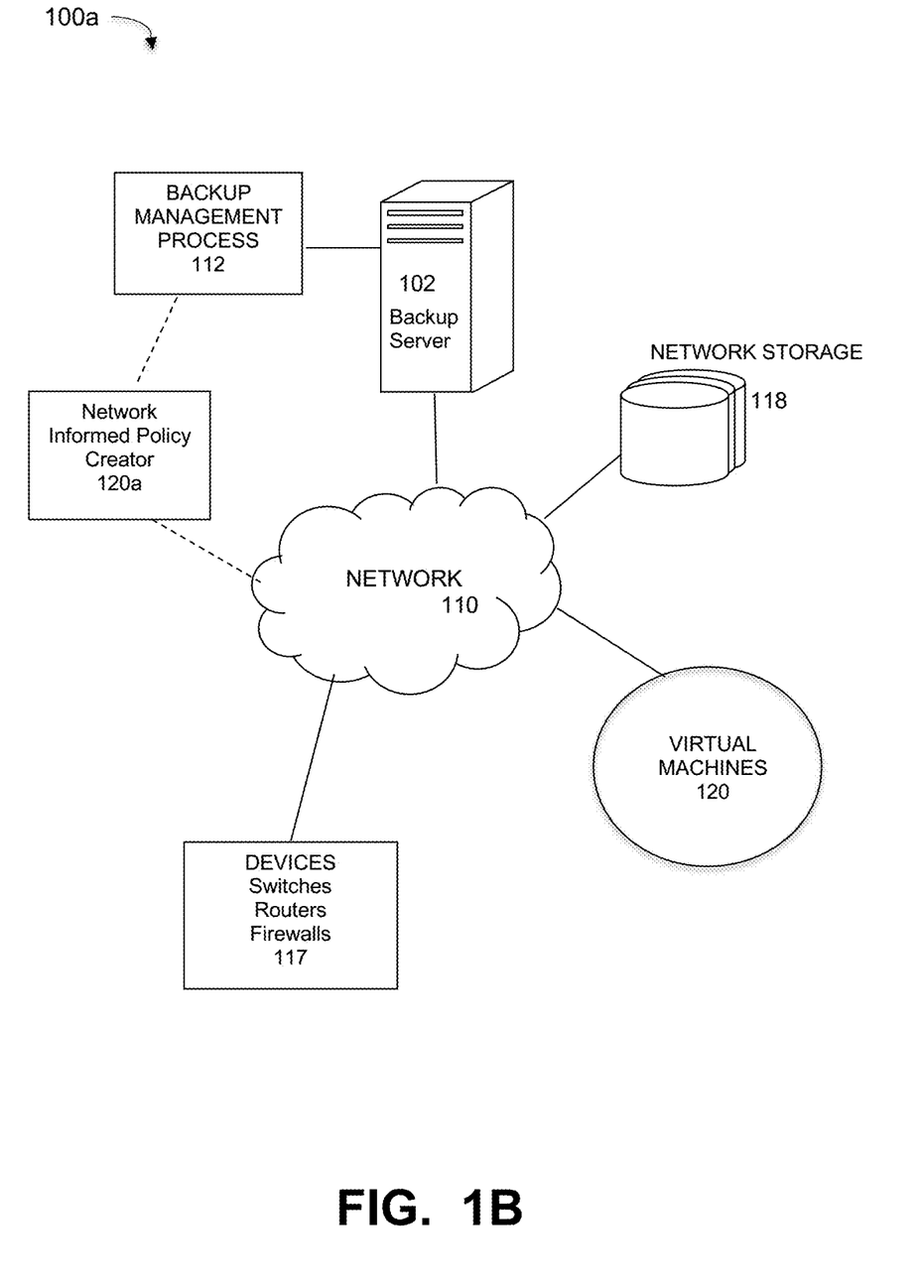
FIG. 1B is a diagram of a network implementing a network informed policy creator for a data backup system, under an alternative embodiment.

FIG. 1A illustrates an embodiment in which the network IPC 120 gathers network device information such as traffic flow through a special and separate out-of-band (00B) network 103. Alternatively, the network IPC 120 can be deployed directly on the source and target, if allowed, to monitor network data flow of each source and target. FIG. 1B illustrates a computer network system 100a that implements one or more embodiments of implementing a network informed policy creator, under an alternative embodiment. In this embodiment, the network informed policy creator 120a is provided as a component or executable function provided in or accessible by the backup management process 112. The network includes devices 117 that may comprise switches, routers, firewalls, and so on. The network IPC 120a works through software agents installed on both the source and target. The agents gather the information that would normally be provided to the network switch as in the out-of-band network embodiment of FIG. 1A.

As stated previously, current backup systems limit application of single policies on all stages of a backup operation thus leading to unpredictable load distribution and potential backup operation failure. Embodiments include a network informed policy creator (IPC) component or process 120 that is integrated into or accessed by the backup software 112. The network IPC process 120 connects with network devices 101 (e.g., managed switches, routers and firewall) to monitor the flow of data between source and destination. It is configured to recommend the transfer stage start time so it can be run later and independent of other stages. Process 120 also keeps a history of data to improve recommendations of the transfer stage within the backup window based on flow of data and available resources on source and destination. Based on these three items, the network IPC 120 helps to back up the data during the backup window and, when appropriate, transfer that data to the destination during the same backup window. The network IPC 120 connects to network devices at both source and destination, and determines the impact of migrating the data based on historical trends and choose the best time to transfer data during the backup window.

For the embodiment of FIG. 1A, the network IPC 120 may be implemented as a component that runs within a data protection infrastructure, and can be run as an independent application or embedded into an instance of data protection software 112 or as part of a data protection appliance. Any of those implementations may also be on-premise implementations on client machines within a user's data center or running as a hosted service within the cloud.

Network device information, such as traffic flow, is generally not available on the production ports of switches, but rather on a special and separate out-of-band (OOB) network 103. In order for the network IPC process 120 to gain access to the management interfaces, it needs to be dual-homed with access to the production network in order to communicate with backup software 112, and the management/out-of-band network 103, which network switches 101 are connected to. This type of setup requires additional security and considerations that are explained in greater detail below.

Implementing the network IPC 120 thus involves getting access to the management interfaces of network devices. The network IPC thus needs to be properly installed and implemented to be dual-homed, that is, to have access to both the out-of-band network and production network.

Figure 2:
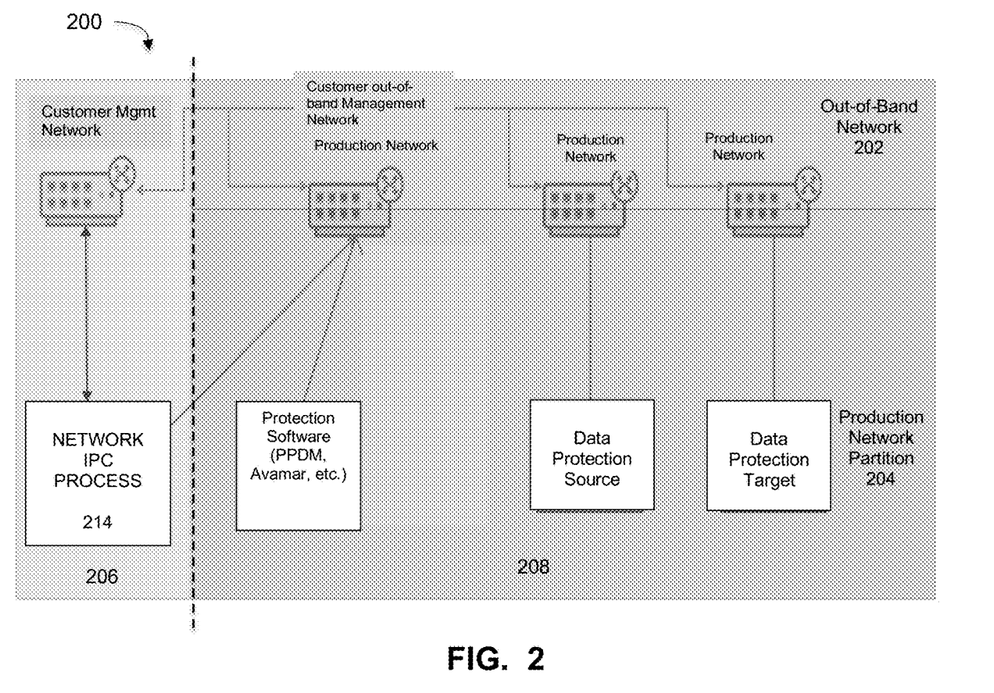
FIG. 2 illustrates an example user network that implements a data protection networking device process, under some embodiments.

FIG. 2 illustrates an example user network that implements a data protection networking device process, under some embodiments. System 200 represents a network comprising a number of user resources, such as production software, protection storage, client server computer, and devices in a production network 204. These resources are coupled to a network through network devices in out-of-band network 202, which is a secured and limited access network used to configure and monitor all network devices that is not accessible by the production network. Each network device (switch, router, firewall, etc.) has their management network port connected to the out-of-band network. The production network 204 comprises a data protection source and a data protection target, but embodiments are not so limited.

For the embodiment of FIG. 2, section 206 represents the network region where the network IPC process 214 is installed. This is a dual-homed component or process in that it has access to both the out-of-band network 202 and the production network 204. Region 208 includes the resources and network devices that are managed by network IPC process 214. The network IPC process 214 may be deployed externally as a VM/physical device within the network or it could be embedded within one or more of the network devices. There may also be multiple instances of network IPC in the customer network. The protection software and storage may be in the production network or in the out-of-band network, or it may even be hosted as a service. For purposes of description, IPC process 214 will be described as a single instance implementation that is dual-homed (i.e., access to out-of-band and production network) and a local instance of protection software and storage, though embodiments are not so limited.

Each network device (e.g., managed switch, a firewall or router) usually has a different method for programmatic control. The traditional industry standard for such control has been Telnet, which is used to administer commands on devices through the use of command line interfaces (CLIs). Due to the insecurity of Telnet, best practices have led to network devices being put on restrictive 'management' networks, such as an out-of-band network. As security improved, other methods such as SSH (Secure Shell) and Rest APIs were added, but the practice of putting the management interface on an out-of-band network is still a viable solution.

Depending on the network device, model, version and the customer configuration, the network IPC process 120 is configured to support each of the following controlling interfaces: Telnet, SSH, ReST API, RestCONF, and vendor specific or similar protocols. In an embodiment, the network IPC process supports a pluggable driver model which adds flexibility to handle a wide variety of network devices. Each driver will support a common set of use cases, such as: commit, backup, and restore operations.

Figure 3:
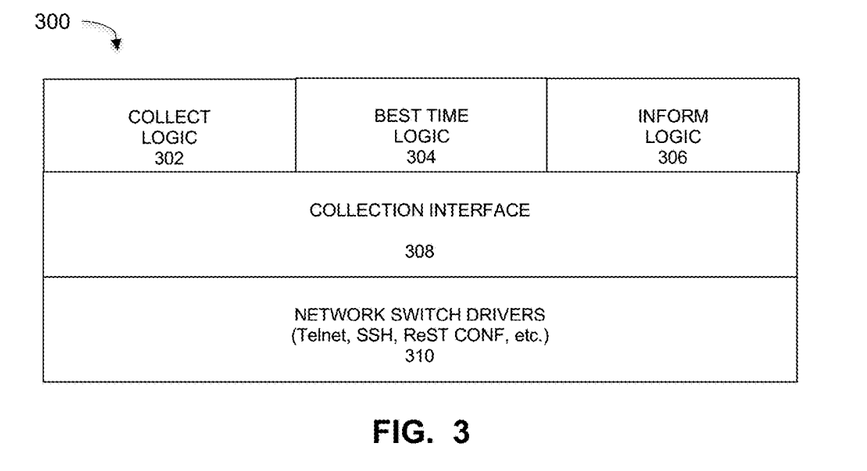
FIG. 3 is a sample driver model and implementation within the data protection networking device process software, under some embodiments.

FIG. 3 is a sample driver model and implementation within the network IPC software, under some embodiments. The software model 300 of FIG. 3 comprises a first layer having collect logic 302, best time logic 304 and inform logic 306; a collections interface layer 304; and a drivers layer 306. The network switch drivers 306 represent drivers that support the interfaces listed above, i.e., Telnet, ReST, CONF, and so on.

A typical system may have many network switches from various vendors that each have their own APIs and specific ways to communicate. For example, some network switches implement a standard called RESTCONF for device management, while other network switches require SSH or even Telnet to achieve the same functionality. For this reason, network IPC 214 is configured to use a pluggable driver model where each driver implements the specific network management protocol which is abstracted by the collection interface. The collection interface 308 offers a generic interface to all switches, regardless of their communication protocol where the process creates the three high level functions of the first layer, namely: collect 302, best time stages 304, and inform 306.

Figure 4:
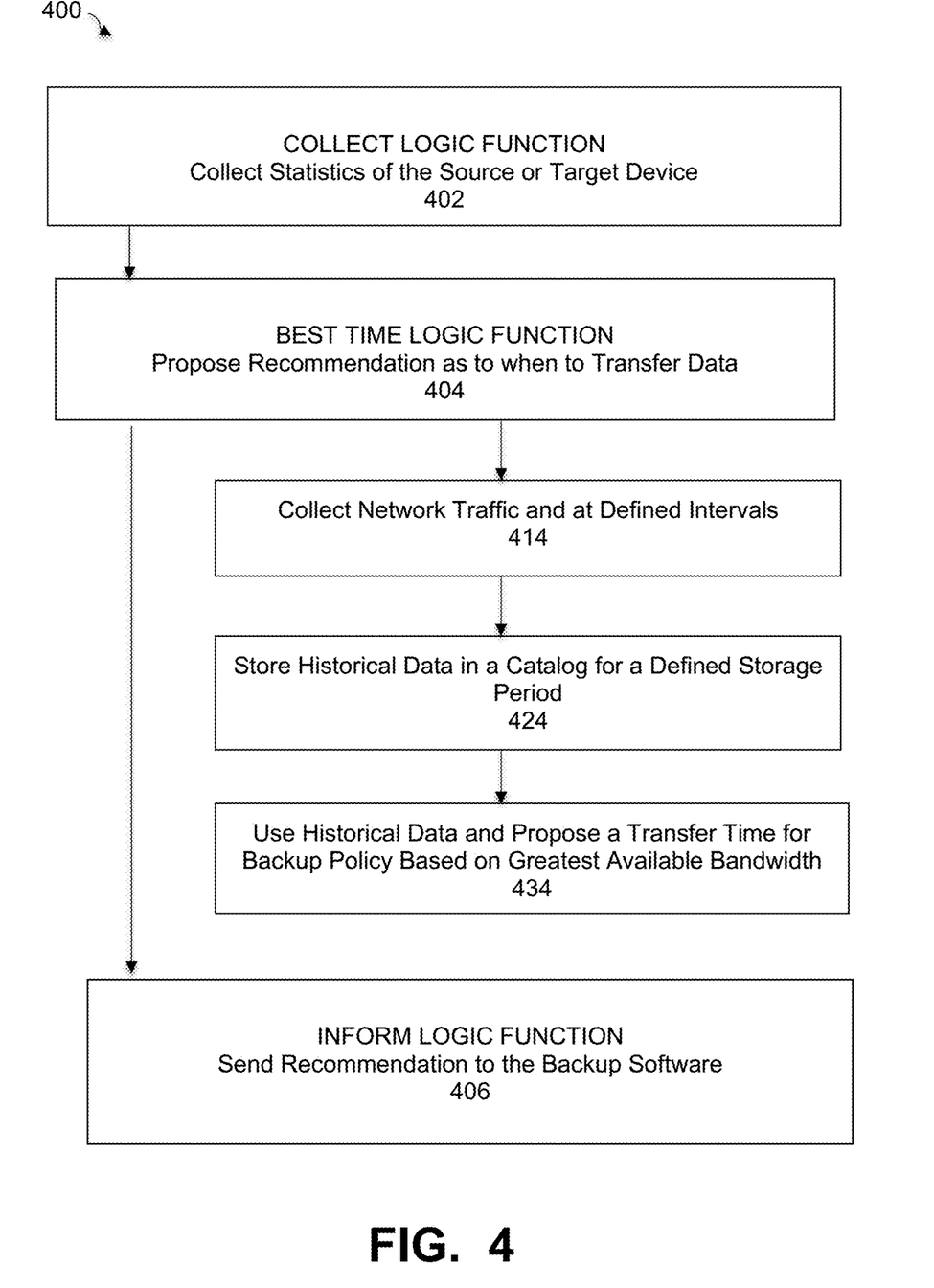
FIG. 4 is a flow diagram that illustrates major functions of the driver layers of the network IPC process, under some embodiments.

FIG. 4 is a flow diagram that illustrates major functions of the driver layers of the network IPC process, under some embodiments. As shown in process 400, the collect logic function 402 connects to each network device and collects the current statistics of the source or target device. The statistics include network bytes received and sent, and any other relevant information.

The best time logic function 404 uses the results from the collection function to propose or recommend an optimum time for the backup software to perform the data transfer of the backup operation.

The inform logic function 406 will send the recommendation proposed by the best time function to the backup software 112. Similar to pluggable drivers for network device management, the inform function 406 can be abstracted so that different protection software can be used with the network IPC.

A main process of FIG. 4 is the best time logic function 404, which provides recommendations as to when the backup software should transfer the data between source and target for a backup. As mentioned earlier, backups can be broken down into stages, such as first taking a snapshot of a block device, and second transferring the snapshot to secondary storage. Additional stages might follow, such as tiering the data offsite from secondary storage, and so on. The best time function works on the data transfer stage as opposed to the backup or any subsequent stage of the entire backup operation. Within every backup, there are multiple stages or steps, where the first step is to back up the data, and the second step is to transfer the data. The best time logic function operates on the second step of the data transfer wherein once the data has been backed up, it provides an option to transfer the data at separate time from the backup stage given the network resources.

The Best Time Algorithm works by figuring out how long the transfer will take for each available transfer window (the 20-minute configurable interval) and matching it to which backup it should transfer within that interval. It does this for each combination that makes sense and then picks the one with the fastest time In order to figure out when to optimally transfer the data, and as shown in FIG. 4, the best time logic function 404 performs several sub-steps. The first main sub-step performed by the network IPC is to collect network traffic, such as incoming and outgoing bandwidth and the network uplink speed, 414. The network IPC collects the data continuously at intervals, such as every minute, or similar time period. The network IPC collect this data using the collect function 402.

This network traffic information is then stored as historical data points in its own catalog, 424. The storage period can be defined as any appropriate length of time, such as 30 days, 60 days, or any other defined period.

Once the data has been stored, the network IPC will look at the historical data and, based on the backup policy it is operating on, will propose a transfer time where the greatest amount of network bandwidth is available between source and destination, 434. This proposal does not eliminate any bottlenecks that might encountered by performing the transfer at the proposed time, but rather it goes for a best effort. The proposed time is then sent as a recommendation to the backup software by the inform logic function 406.

Figure 5:
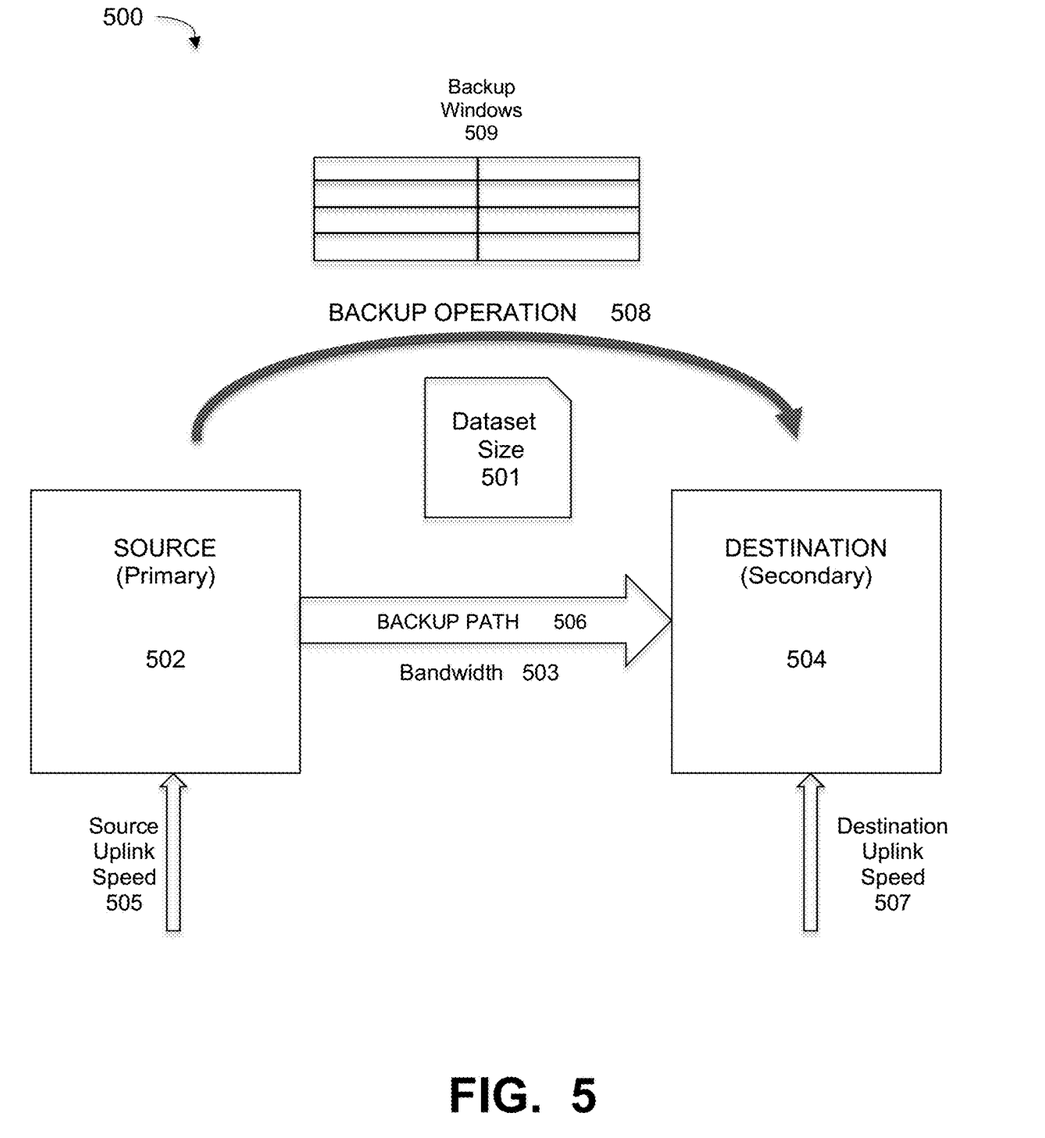
FIG. 5 is a block diagram illustrating some components and parameters for the network IPC process, under some embodiments.

As shown in FIG. 4, the network IPC determines the greatest amount of bandwidth available between source and destination as part of the calculation of the best time for the data transfer. This calculation depends upon several operating and configuration parameters of the backup network and backup dataset. FIG. 5 is a block diagram illustrating some components and parameters for the network IPC process, under some embodiments. FIG. 5 illustrates a system 500 comprising a data source 502 and storage device destination 504 for which a backup operation 508 transfers a set of data to be backed up (dataset) 501 from the source 502 to the destination 504. Several different network paths may be available between the source and destination, and for purposes of description, a defined backup path 506 (which is typically, but may not always be a shortest path) is assumed as the path used for the backup operation 508.

The backup operation 508 is typically executed by the backup software according to a backup schedule that dictates routine backups to be made at regular periodic intervals, e.g., hourly, daily, weekly, etc. Depending on the size of the dataset and backup type (e.g., full, incremental, differential, etc.), a backup operation may take a minimal or significant amount of time. Typically, the backup periods are chosen so that a full backup may be completed within the time before the next scheduled backup. The backups may be taken at a set time during the period, such as 12:01 am every day. However, backup software often provides a number of different backup windows 509 to be selected for the backup operation, thus allowing for some degree of optimization with respect to when the backup operation is performed within the entire backup period. Depending on different system constraints, operating conditions, device health, and so on, certain backup windows may be better than others for a certain scheduled backup operation.

Unlike present backup optimization techniques that focus on selecting the shortest path between the source and destination, the network IPC process selects the best time to transfer the data from among different possible backup windows based on data transfer sizes and historical data about network bandwidth conditions. Thus, for a particular source 502 and destination 504 across a backup path 506, the network IPC process will process certain historical bandwidth 503 metrics, along with source uplink speeds 505 and destination uplink speeds 507 to determine the best time within the backup windows to transfer a dataset 501 having a particular size.

Figure 6:
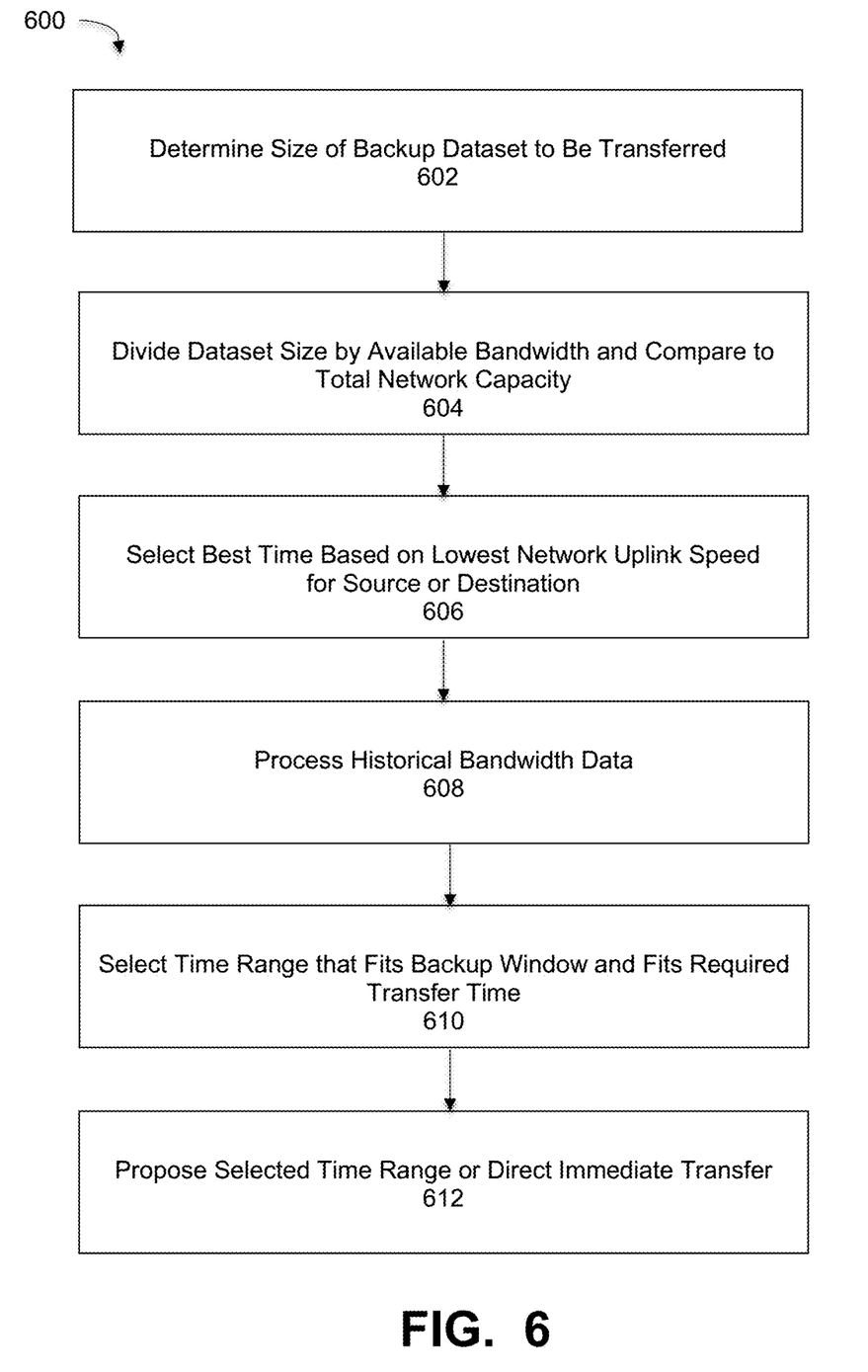
FIG. 6 is a flowchart illustrating a method of calculating the greatest available bandwidth for the optimal transfer time proposal, under some embodiments.

As shown in FIG. 4, a major step (434) in determining a best time to recommend as a backup time is using historical data based on the greatest bandwidth 501 available for the backup path 506. FIG. 6 is a flowchart illustrating a method of calculating the greatest available bandwidth for the optimal transfer time proposal, under some embodiments. For each source and destination, process 600 determines the size of the data that will be transferred, 602. This is generally provided from an earlier stage where the snapshot was taken by the backup software. The best time logic function 404 determines the best time to perform the data transfer data stage after the backup or snapshot phase. The size of the dataset is determined based on the backup stage for the dataset that is then transferred from primary to secondary storage.

The process 600 then takes the total size of the backup and divides it by the available bandwidth for comparison to the total network capacity, 604. With respect to calculating the total network capacity, the network IPC gathers statistics from the network switches about the source and target machines. The network switch provides the uplink speed (e.g., 1 Gbps, 10 Gbps, etc.). Along with that, it also provides how much of that uplink is used (e.g., 500 Mbps, 5 Gbps, etc.). This information is collected in the historical database. How often this information is collected is selected through a user configurable setting. In this example, the time period is every 20 minutes, though other periods are also possible.

Given this information, the process knows the maximum bandwidth available on source and target, which is the uplink speed number. Then for a given time range, the database provides the past historical usage. The difference represents what is left as available to the system. The process uses the lowest bandwidth available between source and target for the entire transfer, as that is the bottleneck between the two systems. The result of this calculation is a time value. If the source and destination network uplink speeds differ from one another, then the lowest network uplink speed is selected, 606.

For the backup windows provided by the backup software, the process 600 processes the historical bandwidth data 608, and for the given time period and selects the time that (1) fits the backup window, and then (2) fits the required transfer time (i.e., how long the transfer will take), 610. The selected time is then sent to the backup software as the recommended proposal. If both conditions (1) and (2) above cannot be met, the network IPC process will direct the backup software to start the transfer immediately, 612.

For the source, the network IPC will only look at historical data that matches outgoing bandwidth. For the destination, the network IPC will only look at historical data for incoming bandwidth.

This process 600 of FIG. 6 can be expressed by the following best time equation: Best_Time=(total_backup_size)/(network_uplink_speed−available bandwidth) over a specified period, e.g., 30 days.

Figure 7:
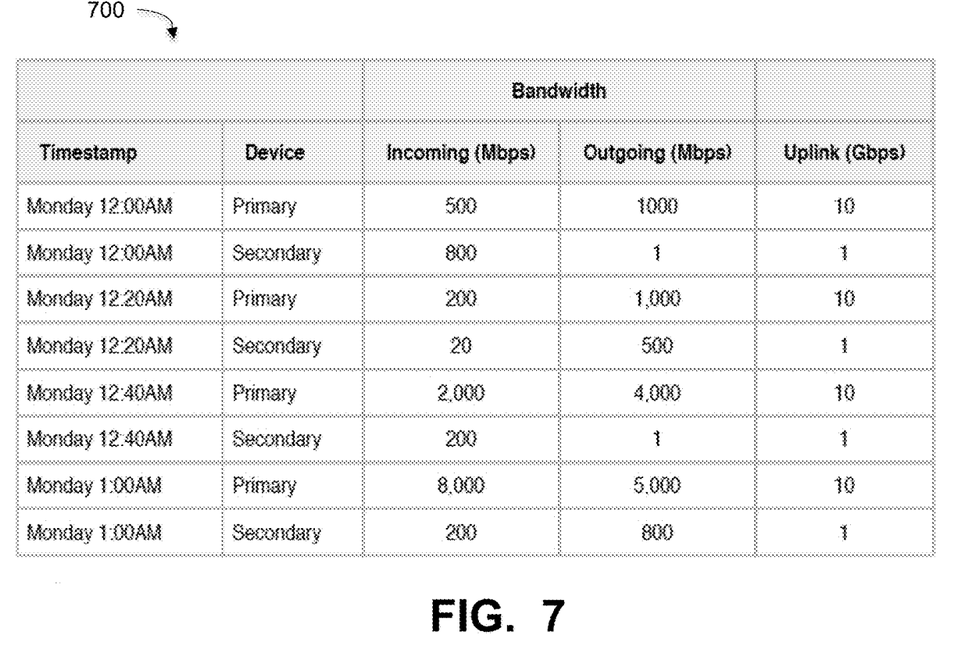
FIG. 7 is a table that illustrates certain example historical operating information for a system, under an example embodiment.
Figure 8:
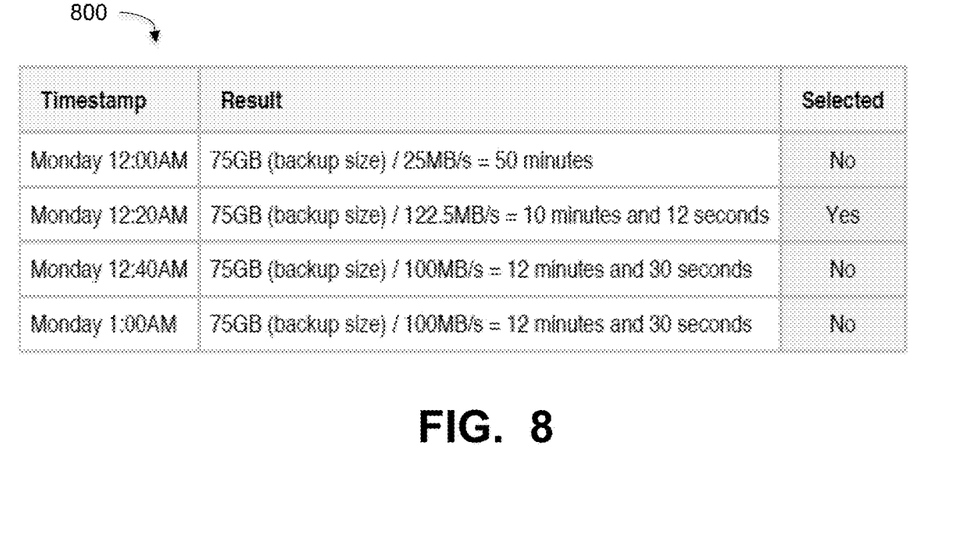
FIG. 8 is a table that illustrates example results for the calculations for the historical data of FIG. 7, under an example embodiment.

Embodiments will be further described with respect to a specific example as illustrated in FIGS. 7 and 8. FIG. 7 is a table 700 that illustrates certain example historical operating information for a system, under an example embodiment. Table 700 lists certain bandwidth 702 and uplink 704 metrics for a primary (source) device and a secondary (destination) device for four different backup windows. The backup windows are timestamped as Monday 12:00 AM, Monday 12:20 AM, Monday 12:40 AM, and Monday 1:00 AM. Table 700 represents just a portion of an entire historical set of data over an entire backup period of 30 days or similar. The granularity of 20 minutes between each backup window represents a defined collection interval for the network IPC process, and can be changed to any appropriate value, such as 10, 15, or 30 minutes, and so on.

The historical information of example table 700 is recorded in the network IPC catalog and stored in a database accessible to both the primary and secondary devices. This historical information is then applied to a defined or provided backup policy. For example, such a policy may dictate the backup software to back up a block device of 75 GB in size between the one-hour window of 12 AM-1 AM. From the table 700, it can be seen that the primary device has a 10 Gbps uplink while the secondary device has a 1 Gbps uplink and the collection interval for the network IPC is every 20 minutes. From the defined policy, a next backup is scheduled to occur at 12 AM on Monday. Based on the process of FIG. 6, the network IPC will consult the historical database 700 and perform certain calculations as follows.

The primary device has a network uplink for 1 Gbps even though the primary device has a 10 Gbps uplink. This is because the secondary device has a network uplink of 1 Gbps and the better time calculation in step (2) states the lowest uplink value is used.

The available bandwidth at 12 AM on the primary device 9,000 Mbps or 9 Gbps. This value is calculated by taking 10 Gbps uplink and subtracting the 1,000 Mbps outgoing bandwidth. The available bandwidth at 12 AM on the secondary device is 200 Mbps. This value is calculated by taking the 1 Gbps uplink and subtracting the 800 Mbps of incoming bandwidth. Due to 200 Mbps being the lowest value between primary and secondary, 200 Mbps is used as the transfer rate. The Mbps value is converted to MB/s as follows: 200 Mbps=25 MB/s. The network IPC process uses the formula defined above and plugs in the values: 75 GB (backup size)/25 MB/s=3000 seconds or 50 minutes. This 50 minutes is the amount of time the backup will take for the 75 GB dataset.

The network IPC process then performs the same calculation at the 12:20 AM, 12:40 and 1 AM entries. FIG. 8 is a table 800 that illustrates example results for the calculations for the historical data of FIG. 7, under an example embodiment. As can be seen in FIG. 8, the network IPC process will determine is the optimal transfer window can occur anytime between 12:20 AM-12:40 AM as the process has calculated that the transfer can be completed within 10 minutes and 12 seconds if this time window is selected. If the backup software did not use the network IPC process, it would start the transfer stage as soon at 12 AM and would take as long as 50 minutes. This is because less bandwidth being available at 12 AM. In addition, transferring at 12 AM might cause a chain reaction of other systems being slowed down that would further cause slowness and ripple throughout the network. Thus, in this example, a later time window is better than an earlier time window and allows the backup operation to complete faster even though it starts later.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 9:
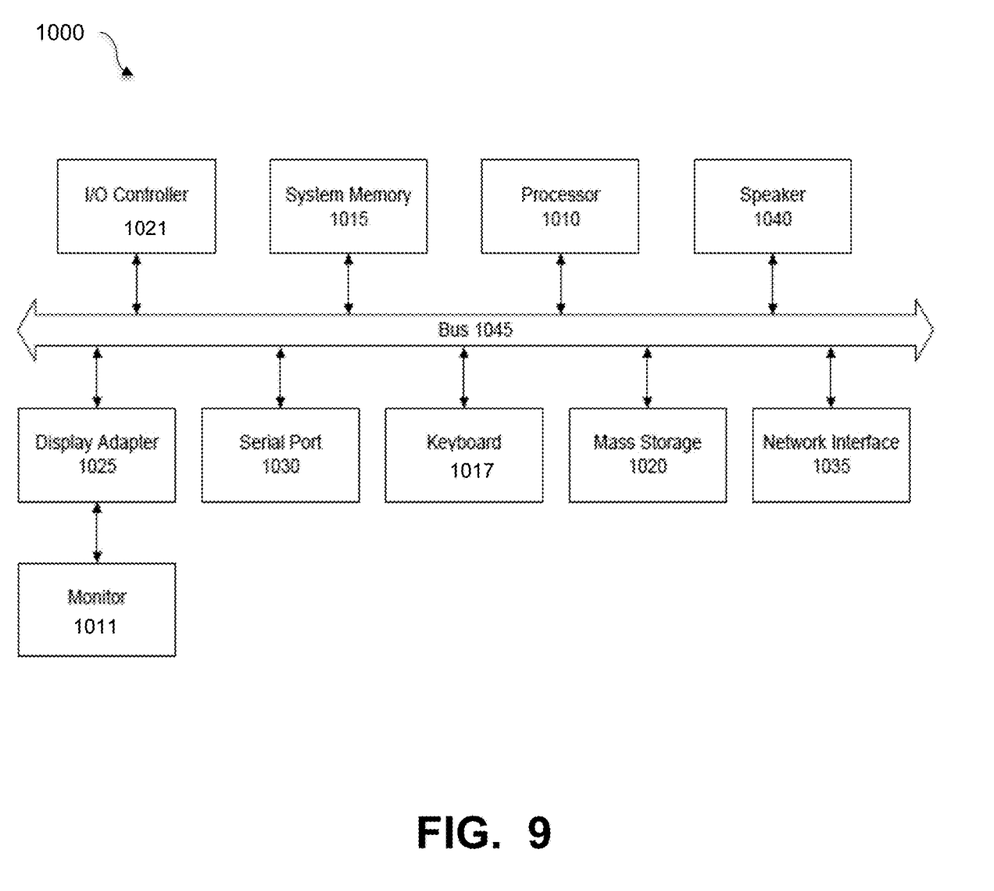
FIG. 9 is a system block diagram of a computer system used to execute one or more software components of an organization awareness method for automating data protection policies, under some embodiments.

The network of FIG. 1A may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the present system described herein. The computer system 1000 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of optimizing a backup operation for a data protection system, comprising:
    first deploying a production network implementing a backup program executing the backup operation that comprises a plurality of stages including taking a snapshot of a block device, transferring the snapshot to secondary storage, and tiering backup data from secondary storage to other storage;

second deploying an out-of-band network comprising network devices managing network connectivity for the production network, and wherein the network devices are dual-homed to provide access to the production network and the out-of-band network;

implementing the backup operation using a policy that specifies a plurality of service requirements and that is initiated at a time within a plurality of time windows;

determining a size of dataset to be backed up by the backup operation;

monitoring a flow of data between a source and a destination of data in the network using management interfaces of the out-of-band network;

compiling historical data of operational parameters for data transfers between the source and destination, the operational parameters comprising incoming and outgoing bandwidth for each of the source and destination, and uplink speed for each of the source and destination; and determining an optimum time within the plurality of time windows based on the dataset size and the historical data by determining a time where the greatest amount of network bandwidth is available for the data transfers based on the incoming and outgoing bandwidth and uplink speed between the source and destination for the transferring stage of the backup operation so that backup data transfer is optimized for the transferring stage as decoupled from the snapshot taking and tiering stages of the backup operation.

2. The method of claim 1 wherein the network devices comprise out-of-band devices coupled to other network equipment devices through a network implementing out-of-band protocols, and wherein a management port of each network device is connected to the out-of-band network.

3. The method of claim 2 wherein the network devices comprise at least one of managed switches, routers, or firewall devices.

4. The method of claim 3 wherein the network comprises the out-of-band protocol network and the production software network coupling a plurality of computers together for the execution of one or more applications.

5. The method of claim 1 wherein the policy is selected from a plurality of backup policies specifying a target storage location, a recovery time objective, and a recovery point objective for data backed up under the backup policy.

6. The method of claim 1 further comprising transmitting the determined optimum time as a proposed time to transfer the dataset from the source to the destination after a snapshot backup executed by the data protection system for the snapshot taking stage.

7. The method of claim 1 wherein the dataset size is provided by a snapshot operation taking the snapshot copy.

8. A computer-implemented method of optimizing a backup operation for a data protection system having a data source and a data destination, comprising:

first accessing a production network implementing a backup program of the data protection system and executing the backup operation that comprises a plurality of stages including taking a snapshot of a block device, transferring the snapshot to secondary storage, and tiering backup data from secondary storage to other storage;

second accessing an out-of-band network comprising network devices managing network connectivity for the production network, and wherein the network devices are dual-homed to provide access to the production network and the out-of-band network;

collecting network traffic information including network bandwidth, and a network uplink speed using a management interface of the out-of-band network;

determining a size of a dataset to be saved in the destination to derive a dataset size;

determining an available bandwidth between the source and destination, wherein the available bandwidth is calculated as a difference of the network uplink speed and an incoming and outgoing bandwidth; and determining a best time to perform a data transfer from the source to the destination by dividing the dataset size by the available bandwidth, wherein the best time corresponds to a time where the greatest amount of network bandwidth is available for the data transfers based on the network bandwidth and network uplink speed between the source and destination for the transferring stage of the backup operation so that backup data transfer is optimized for the transferring stage as decoupled from the snapshot taking and tiering stages of the backup operation.

9. The method of claim 8 further comprising:

compiling the collected network traffic information as historical data stored as a catalog in a database; and determining the best time for a defined period within the historical data.

10. The method of claim 8 wherein the best time represents a time to initiate the backup operation that results in a shortest data transfer time from the source to destination as compared to other possible start times in a defined time period.

11. The method of claim 10 wherein the best time is a time within a number of defined time windows applying a backup policy to the dataset for the backup operation.

12. The method of 11 wherein the best time fits within a defined time window and is of a duration that fits within a time period defined by the defined time windows.

13. The method of claim 9 wherein the network traffic information is collected for a plurality of network devices comprise at least one of managed switches, routers, or firewall devices, and wherein the network comprises the out-of-band protocol network and the production software network coupling a plurality of computers together for the execution of one or more applications.

14. The method of claim 1 further comprising transmitting the determined optimum time as a proposed time to transfer the dataset from the source to the destination after a snapshot backup executed by the data protection system.

15. The method of claim 8 wherein the backup operation comprises a plurality of stages comprising taking a snapshot copy of the dataset from the source, transferring the dataset to the destination, tiering of the dataset to cloud storage, or replicating the dataset to secondary storage.

16. A non-transitory computer program product having stored thereon instructions that, when executed by a processor, cause the processor to perform a method of optimizing a backup operation for a data protection system, comprising:

first accessing a production network implementing a backup program of the data protection system and executing the backup operation that comprises a plurality of stages including taking a snapshot of a block device, transferring the snapshot to secondary storage, and tiering backup data from secondary storage to other storage;

second accessing an out-of-band network comprising network devices managing network connectivity for the production network, and wherein the network devices are dual-homed to provide access to the production network and the out-of-band network;

collecting network traffic information including network bandwidth, and a network uplink speed using a management interface of the out-of-band network;

determining a size of a dataset to be saved in the destination to derive a dataset size;

determining an available bandwidth between the source and destination, wherein the available bandwidth is calculated as a difference of the network uplink speed and an incoming and outgoing bandwidth; and determining a best time to perform a data transfer from the source to the destination by dividing the dataset size by the available bandwidth, wherein the best time corresponds to a time where the greatest amount of network bandwidth is available for the data transfers based on the network bandwidth and network uplink speed between the source and destination for the transferring stage of the backup operation so that backup data transfer is optimized for the transferring stage as decoupled from the snapshot taking and tiering stages of the backup operation.

\* \* \* \* \*